United States Patent
McIntosh

(10) Patent No.: US 9,391,478 B2
(45) Date of Patent: Jul. 12, 2016

(54) LOW-COST LOW-COG PM MACHINE

(76) Inventor: Devon R. McIntosh, Accokeek, MD (US)

(*) Notice: Subject to any disclaimer, the term of this patent is extended or adjusted under 35 U.S.C. 154(b) by 1056 days.

(21) Appl. No.: 13/531,258

(22) Filed: Jun. 22, 2012

(65) Prior Publication Data

US 2013/0002058 A1    Jan. 3, 2013

Related U.S. Application Data

(60) Provisional application No. 61/503,438, filed on Jun. 30, 2011.

(51) Int. Cl.
*H02K 1/14* (2006.01)
*H02K 1/18* (2006.01)
*H02K 29/03* (2006.01)

(52) U.S. Cl.
CPC ............... *H02K 1/148* (2013.01); *H02K 1/185* (2013.01); *H02K 29/03* (2013.01)

(58) Field of Classification Search
CPC ........ H02K 1/278; H02K 1/148; H02K 1/185
USPC ................... 310/219.009, 216.064, 216.091, 310/216.093
See application file for complete search history.

(56) References Cited

U.S. PATENT DOCUMENTS

| | | | | | |
|---|---|---|---|---|---|
| 5,796,195 | A | * | 8/1998 | Miyakawa | B60K 6/26 310/216.009 |
| 2006/0238063 | A1 | * | 10/2006 | Neal | G11B 19/2009 310/43 |
| 2007/0279178 | A1 | * | 12/2007 | Zimmer | H02K 3/325 336/208 |
| 2009/0195101 | A1 | * | 8/2009 | Yang | H02K 1/278 310/156.22 |
| 2010/0176680 | A1 | * | 7/2010 | Murakami | H02K 1/278 310/156.38 |
| 2010/0295403 | A1 | * | 11/2010 | Morita | H02K 1/146 310/156.78 |

FOREIGN PATENT DOCUMENTS

| | | |
|---|---|---|
| CN | 101501959 A | 8/2009 |
| JP | 2002-335642 A | 11/2002 |
| JP | 2004-064924 A | 2/2004 |
| JP | 2004-248440 A | 9/2004 |
| JP | 2006-288042 A | 10/2006 |

OTHER PUBLICATIONS

PCT Written Opinion for corresponding case, PCT/US2012/043850, dated Jan. 21, 2013.

* cited by examiner

*Primary Examiner* — Terrance Kenerly
(74) *Attorney, Agent, or Firm* — David A. Guerra

(57) ABSTRACT

Due largely to their high torque-to-current and torque-to-volume ratios, permanent magnet (PM) motors and generators are increasingly being used in a wide range of high performance applications, such as industrial drives, robotics, computer peripherals, and automotive applications. The present invention utilizes stator modularity to enable cost efficiency by significantly decreasing stator core manufacturing costs, and coil forming and fixturing costs in several ways. Minimizing costs extend to a novel, lightweight, support structure that does not require the usual encasement structure. The approach presents a challenge to mitigating cogging torque via popular methods; therefore a novel anti-cogging approach was developed that is a natural outgrowth of the modular layout instead of being negatively impacted by. The result is a low cost PM machine design and method with low cogging torque.

25 Claims, 16 Drawing Sheets

LOW-COST LOW-COG PM MACHINE

SUPPORT FOR THE INVENTION

The invention described herein was supported by Small Business Innovation Research (SBIR) pursuant to Competitive Grant no. 2011-33610-30858 from the USDA National Institute of Food and Agriculture.

BACKGROUND OF THE INVENTION

1. Field of the Invention

The invention relates generally to permanent magnet motors and generators, and particularly to minimizing the cost and cogging torque of such PM machines.

2. Description of Related Art

Due largely to their high torque-to-current and torque-to-volume ratios, permanent magnet (PM) motors and generators are increasingly being used in a wide range of high performance applications such as industrial drives, robotics, computer peripherals, and automotive applications. The PM's are mounted on the rotor, which is the rotating part of the machine, while the stator, which is the stationary part of the machine, contains the coils wrapped around stator teeth that are interconnected via the stator back-iron. Indeed, the combination of stator teeth and back-iron is called the core; the term iron is used throughout to generically denote any material with high magnetic permeability. Often shoes are used with the teeth. As is understood in the art, shoes are widened areas at the teeth tips used to minimize cogging torque by minimizing the discontinuities in magnetic attraction to the rotor magnets. The spaces between teeth are called slots, and the openings to the slots between adjacent shoe tips are called slot gaps.

A Modular (or segmented) stator is one in which the stator is segmented into individual subassemblies that can be subsequently combined to form the overall stator structure. Modular stators per se are not new, but its use to facilitate low-cost coil fixturing is new, as is its use to allow an economical PM machine design, such as set forth in the present invention described in more detail hereinbelow.

The present approach utilizes stator modules that are separately formed and subsequently interconnected to enable cost efficiency by significantly decreasing stator core manufacturing costs, and coil forming and fixturing costs in several ways. (a) First, the modularity greatly reduces the material waste problem because the hollow circular shape of the stator core does not have to be formed in the steel blank when creating the rotor cavity. Instead the shape and cavity are formed only during assembly subsequent to any metal forming. This is particularly important for a ring layout because, by definition, its ring-like shape is extensively hollowed out. (b) Second, the larger more expensive lamination stamping equipment and dies required for forming full stator laminations can be replaced with smaller less expensive dies and equipment for forming the much smaller individual core modules. (c) Third, for the case when each module comprises a single tooth, the coil can be directly wound by a general purpose bobbin winder prior to stator assembly, thereby overcoming the most costly production steps. To adequately insulate the coil from the teeth, rigid or semi-rigid insulation is used on the stator ends, which displaces the coil away from particular module sections while engaging with other insulation sections to remain secured about the teeth.

The invention also utilizes a novel structural support for the stator modules. Besides dovetail connections on each module, rigid pins through the backiron sections of the modules secure them to the frame. Moreover, securing the laminations within each individual stack via a process such as epoxy bonding, welding, cleating, or lamination interlocking via dimples formed within each laminate further enhances rigidity. These connection arrangements can also facilitate a novel lightweight casing, wherein structural support is mainly borne by the endplates, which are directly or indirectly connected to the pins. Unlike other designs, a precision formed cylindrical casing (which becomes significantly more expensive as generator diameter increases) is not needed, and is optional. A spacer ring extends between the stator modules and the endplates to maintain predetermined spacing, and along with the stator modules and endplates completely seal off the machine interior from the elements.

Cogging torque is the torque needed to overcome the tendency of the PM's on the rotor to align at preferential locations opposite the protruding teeth on the stator where magnetic attraction is greatest. Our anti-cogging design, is a natural outgrowth of the modular layout instead of being negatively impacted by it. The highly modular structure makes utilizing the popular anti-cogging technique of skewing essentially impossible. And other anti-cogging techniques such as optimizing the shoe width, the pole width, and the pole-to-teeth number ratio, pairing shoes and poles of different widths, shaping the magnets, notching the teeth and shifting the poles are not sufficient to provide the desired two orders of magnitude lower cogging torque relative to the max generator torque. One aspect of the invention that addresses this challenge is the use of semi-closed (or partially closed) slots, which can decrease the tendency for cogging. Semi-closed slots have slot gap widths that are much smaller than the spacing between similar points on neighboring shoes (i.e. the slot pitch), and for the purposes of this patent we define semi-closed slots as being no wider than 15% of the slot pitch. However, one drawback with such narrow slot openings is that there may not be sufficient spacing to form and fixture the coils around the teeth. Essentially, semi-closed slots make coil insertion through the gap between neighboring shoe tip impractical, thereby requiring the use of needle winders to "sew" the coils around the teeth. One version of the invention that addresses this issue utilizes a single tooth modular structure that allows coil winding directly about the teeth with a simple bobbin winder.

The technique of partially closing the slot is not new, but the invention provides a novel multi-section shoe design that is better able to modulate the magnetic saturation within the shoe, and provide more advantageous magnetic permeability variations for minimizing cogging torque.

To further decrease cogging torque, the invention facilitates using extremely narrow shoe tip gaps of less than 8% of the slot pitch, thereby allowing further cogging torque reduction. For such narrow shoe tip gaps, to decrease excessive magnetic flux leakage between neighboring shoe tips, substantially pointy shoe tips are used, and although this causes substantial magnetic saturation within the tips, the novel multi-section shoe design is better able to modulate the magnetic saturation within the entire shoe, and provide more advantageous magnetic permeability variations for minimizing cogging torque (pointy here is defined as shoe tips with much smaller distal ends than the end that attaches to the stator teeth).

Cogging torque is also minimized through the use of magnets with sloped edges (instead of 90 degree edges). Besides being well-suited for use with semi-closed slots, this technique facilitates a novel mounting arrangement in which pins are used to secure the magnets from translational motion along the surface of the rotor iron, while an adhesive is used along the sloped magnet surfaces and between magnets to constrain against other relative motion. In this way, adhesive between the mating surfaces of the magnets and the rotor iron is not needed and is optional.

SUMMARY OF THE INVENTION

The invention utilizes stator modularity to enable cost efficiency by significantly decreasing stator core manufacturing costs, and coil forming and fixturing costs in several ways. Minimizing costs extend to a novel, lightweight, support structure that does not require the usual encasement structure. The approach presents a challenge to mitigating cogging torque via popular methods; therefore a novel anti-cogging approach was developed that is a natural outgrowth of the modular layout instead of being negatively impacted by. The result is a low cost PM machine design with low cogging torque.

BRIEF DESCRIPTION OF THE DRAWINGS

While the specification concludes with claims particularly pointing out and distinctly claiming the subject matter that is regarded as forming the present invention, it is believed that the invention will be better understood from the following Detailed Description, taken in conjunction with the accompanying Drawings, where like reference numerals designate like structural and other elements, in which:

DETAILED DESCRIPTION OF THE INVENTION

The present invention will now be described more fully hereinafter with reference to the accompanying Drawings, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

Figure 1:
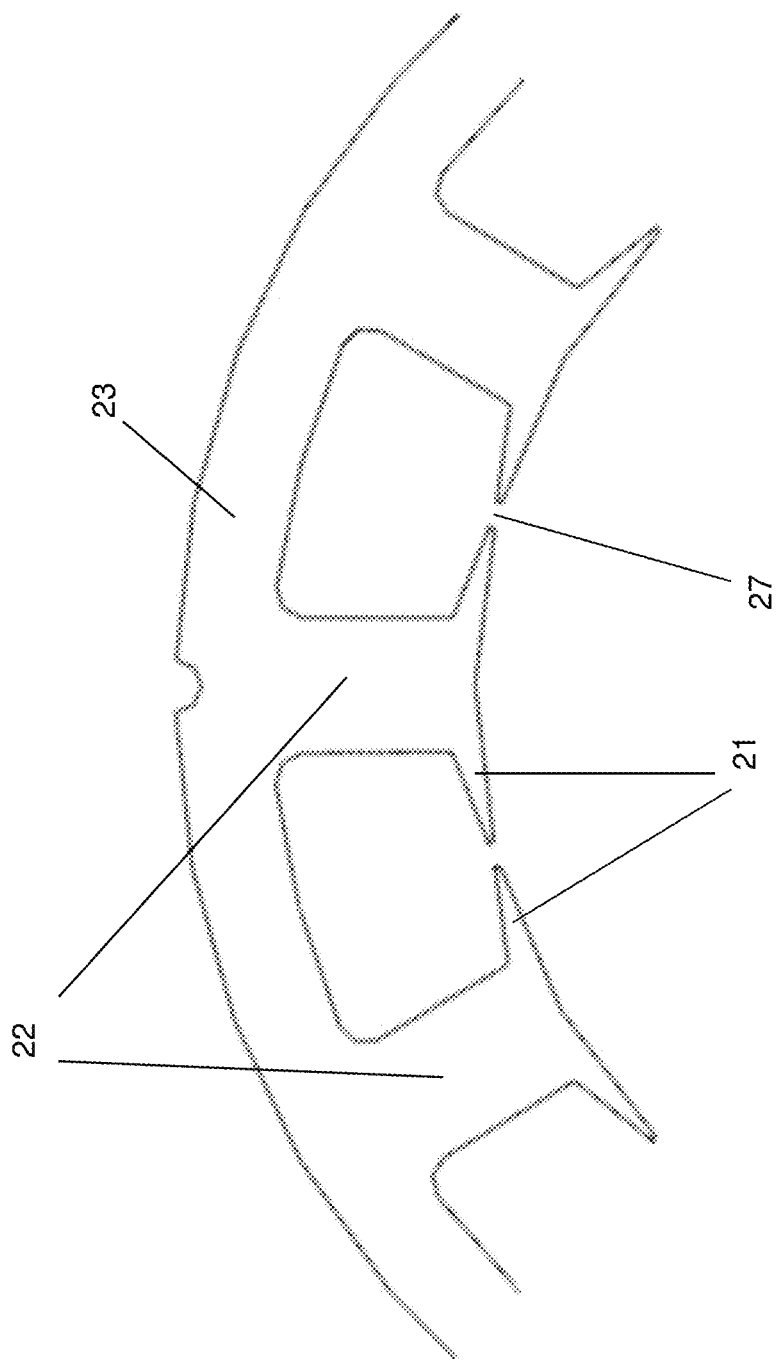
FIG. 1 is a prior art stator design.

FIG. 1 is a prior art stator design showing the semi-closed slots 27. The teeth 22 are connected via the stator back-iron 23, which together with the stator shoes 21 form the stator (coils not shown). The rotor with rotor magnets are not shown here (see the following figures), but when ratios between the number of permanent magnets (PM's) and the number of slots are fractional values, the out-of-phase attractions between different PM-shoe parings can be optimized for cogging torque reduction by optimizing the shoe width-to-slot pitch ratio, which can be varied either by varying the shoe width or the slot pitch. The important thing here is that the shoes are of the typical mono-sectional design, which do not allow optimizing the magnetic permeability variations within the shoes within the time varying PM field to the extent possible with the multi-sectional shoes of the invention.

Figure 2:
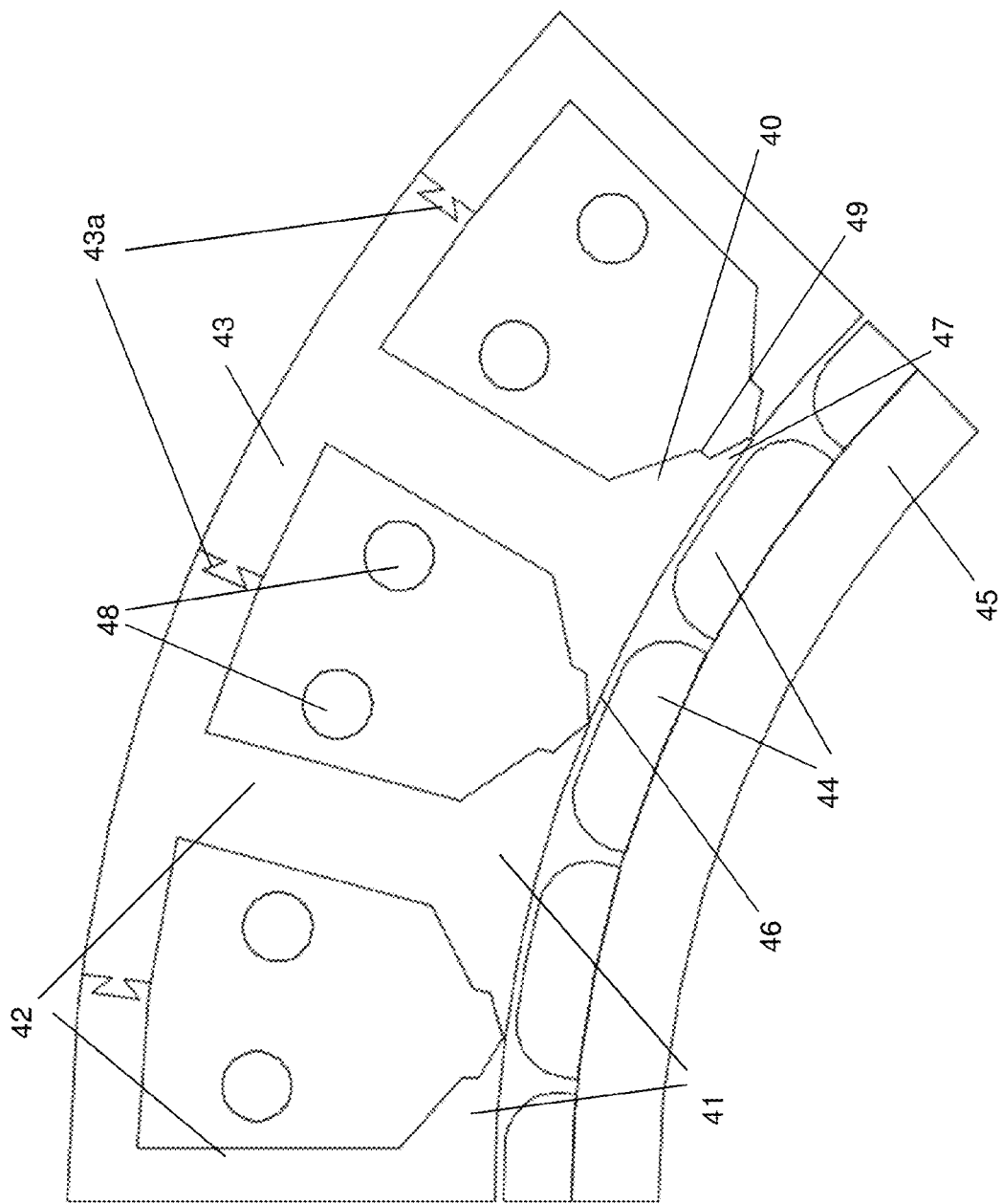
FIG. 2 illustrates a 24-slot, 32-pole 3-phase embodiment of the present invention.

FIG. 2 shows a 24-slot, 32-pole embodiment of a unit cell of the invention having three teeth and four magnets in each cell. The teeth 42 are connected via the stator back-iron 43, which together with the stator shoes 41 and stator coils 48 form the stator. The stator is of the modular type where each module contains a single tooth so as to form somewhat of an "I" shape. This allows direct winding of the coil onto the stator (not shown is the electrical insulation under the coil around the teeth). These I-core modules are mutually interconnected via a dovetail interface 43a that helps to maintain a rigid stator structure. The mounting holes in the back-iron sections are not shown here, but are shown in the more detailed FIG. 11 diagram. The rotor contains the rotor magnets 44 and rotor back-iron 45 and is separated from the stator by the magnetic airgap 46. The root region 40 of the shoes is connected to the tip region 47 via an abrupt transition region with a large slope 49. The shoe tip region has significantly smaller radial lengths than the root region so as to provide the root with significantly greater permeability and permeance than the tip, and the abrupt transition provides an abrupt permeance transition, which facilitates optimizing cogging torque cancellation. The arc width of the root is first determined via the shoe width optimization approach under the assumption that the root constitutes the entire shoe (i.e. no shoe tips). Its thickness is determined as that which is just enough to prevent magnetic saturation. Subsequently, the shoe tip is added with an arc width that almost touches the adjacent tip, a thickness adjacent to the root section that is about half that of the root at that point, and a substantially pointy shoe tip end. The dimensions of the entire shoe are then fine-tuned via finite element analysis. Also, via well-known analytical and finite element analysis, magnet size and rounding of the magnet edges are also optimized to minimize cogging torque.

Figure 3:
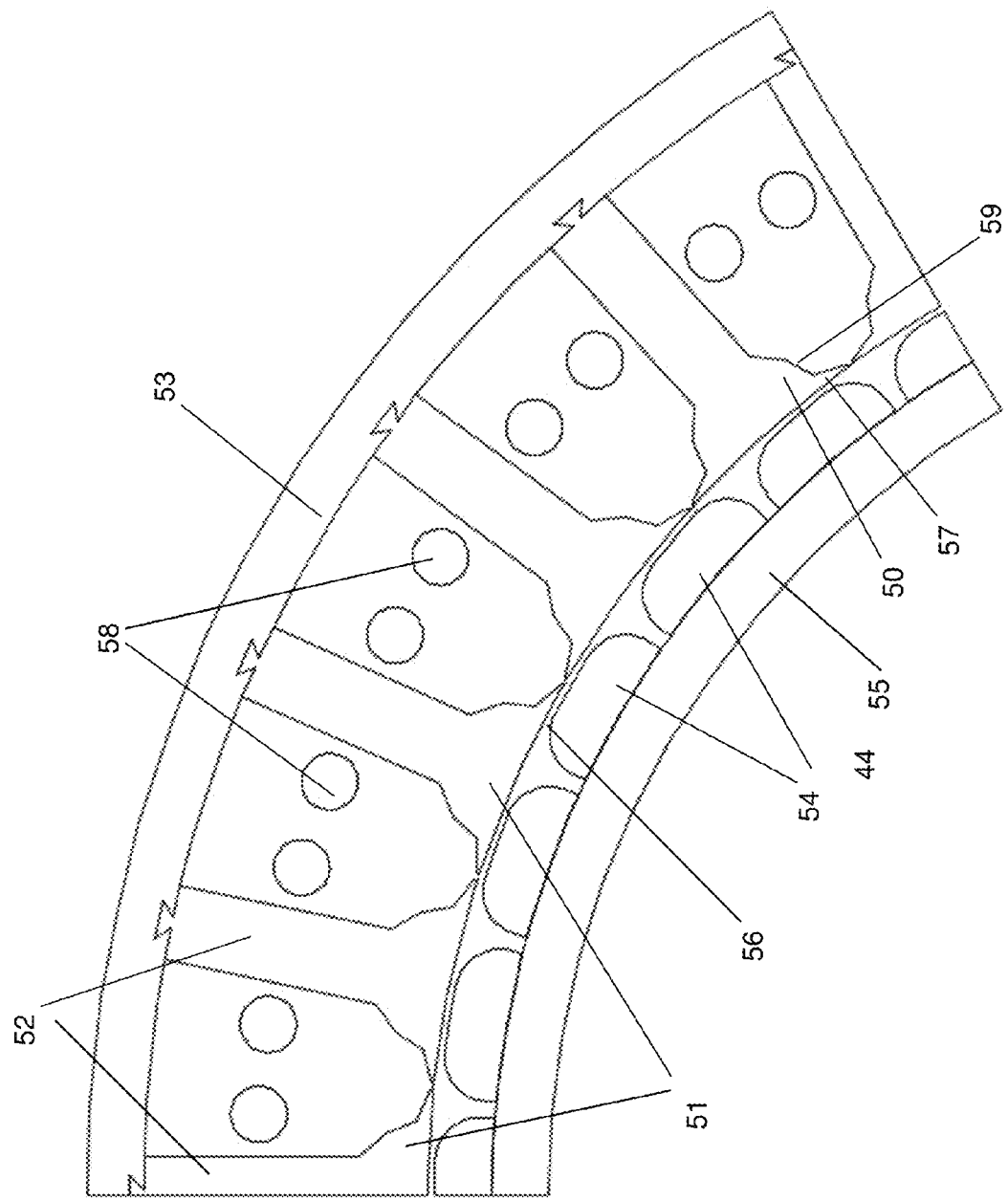
FIG. 3 illustrates a 30-slot, 36-pole embodiment of the present invention.
Figure 4:
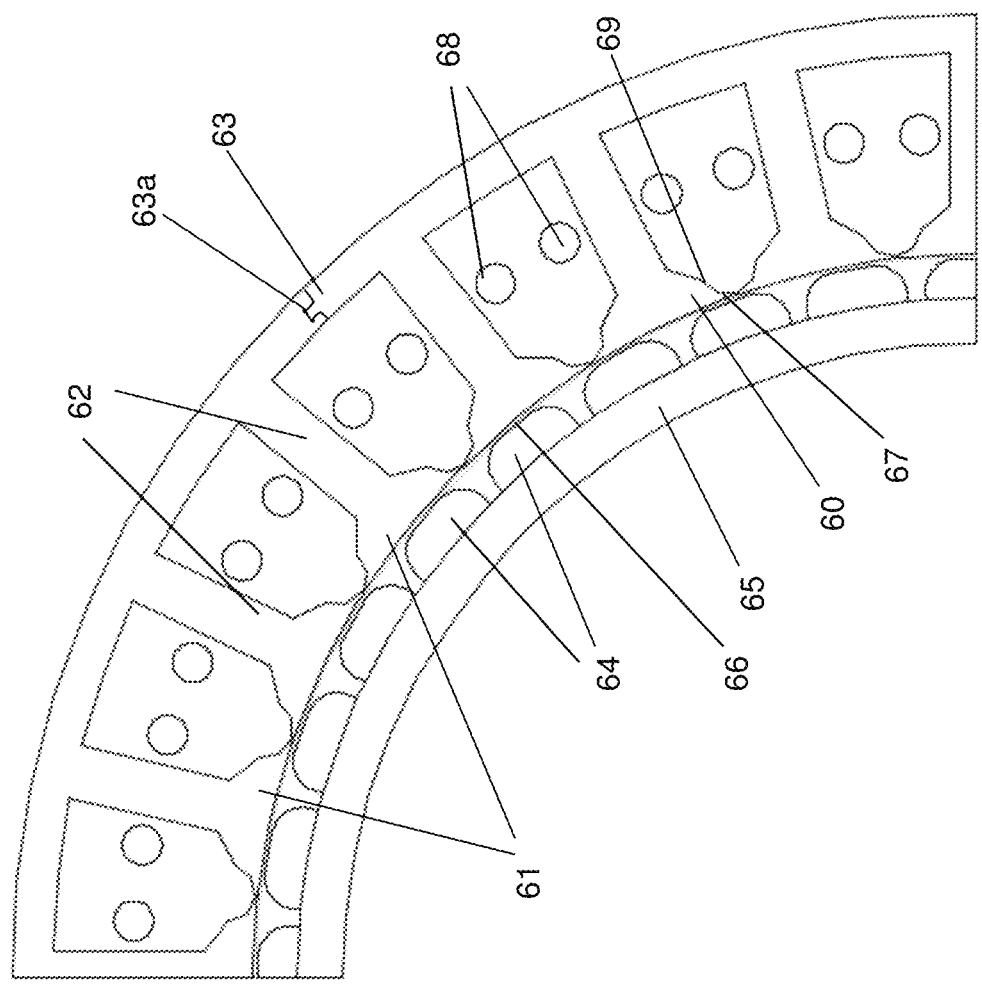
FIG. 4 illustrates a 28-slot, 36-pole embodiment of the present invention.

The description of FIG. 3 and FIG. 4 follows that of FIG. 2. FIG. 3 shows a 30-slot, 36-pole embodiment and FIG. 4 shows a 28-slot, 36-pole embodiment of a unit cell of the invention having five (seven) teeth and six (nine) magnets in each cell. The teeth 52 (62) are connected via the stator back-iron 53 (63), which together with the stator shoes 51 (61) and stator coils 58 (68) form the stator. The rotor contains the rotor magnets 54 (64) and rotor back-iron 55 (65) and is separated from the stator by the magnetic airgap 56 (66). The root region 50 (60) of the shoes is connected to the tip region 57 (67) via an abrupt transition region with a large slope 59 (69). The stator back-iron of FIG. 3 is preferably not segmented. Instead, the teeth plug into, and are removable from the back-iron via keyed interfaces 53a so as to facilitate coil fixturing. The stator back-iron of FIG. 4 is segmented in one location via a keyed interface 63a that is different from that of FIG. 2. In this case the coils are preferably sewed around the teeth.

Figure 5:
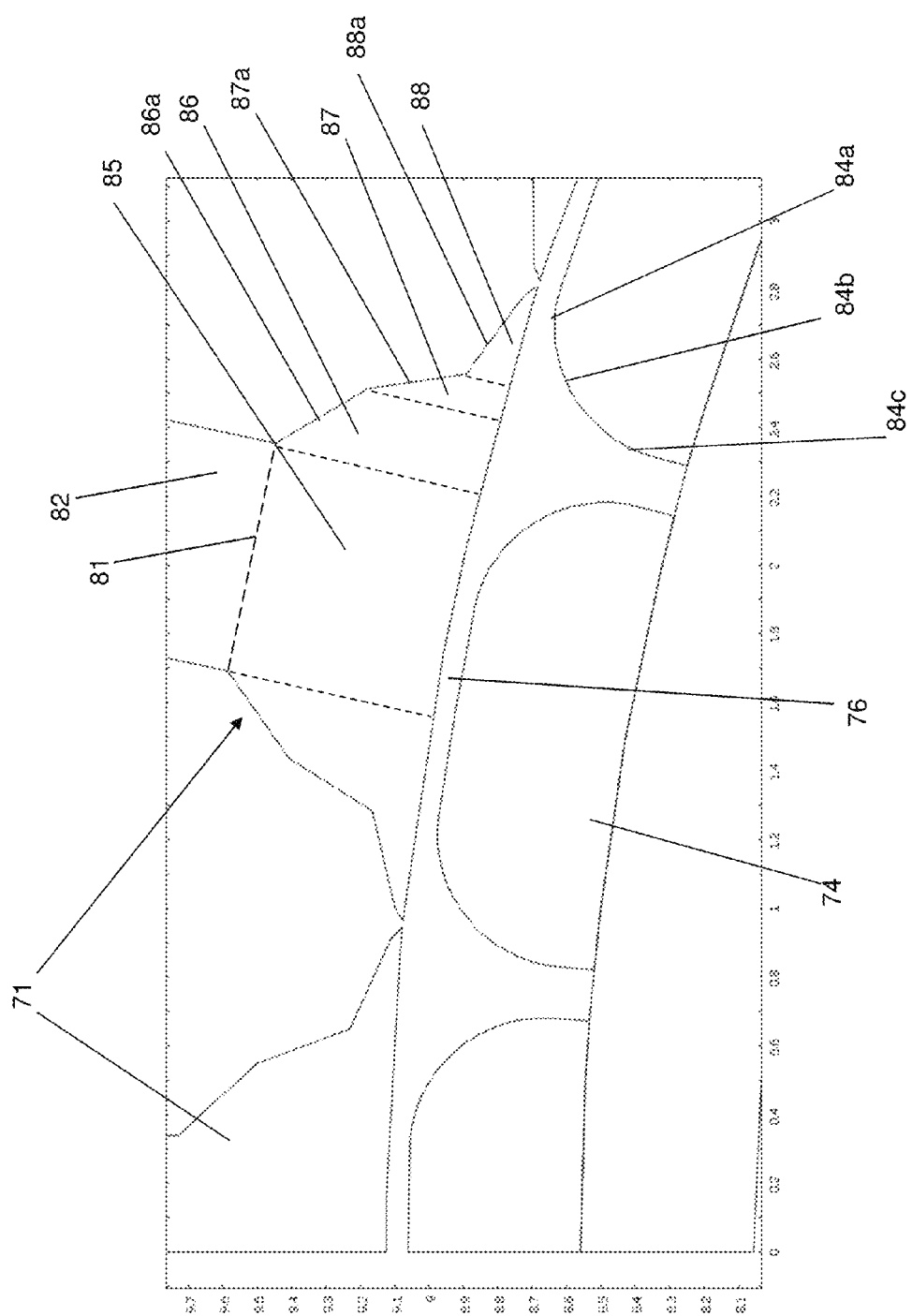
FIG. 5 is an overall diagram illustrating many of the features of the present invention.

FIG. 5 is a generic graphic of portions of a stator and rotor with points that have been labeled to facilitate a more detailed description. Reference numeral 71 is the stator shoe, 82 is a stator tooth, and 81 is the imaginary line separating them. Magnetic airgap 76 separate the shoes from the NIB PM's 74. The surface 84a within the magnetic airgap transitions from a generally circumferential direction to a generally radial surface 84c via a curved surface 84b. To decrease the abruptness of the magnetic field transition, which decreases cogging torque, the radius of curvature of 84c must be greater than the airgap. In this case it is about 0.40 inches and is preferably optimized via FEA calculations. The shoes 71 comprise a tooth region 85 that is directly under the tooth 82, a root region 86 that connects to the teeth region, a tip region 88 at the distal end of the shoe, and a transition region 87 that connects the root and tip regions (dotted lines are used to demarcate the regions). The upper profile of the root region 86a has an average root slope, the upper profile of the transition region 87a has an average transition slope, and the upper profile of the tip region 88a has an average tip slope, wherein the absolute value of the average transition slope is much greater (about twice as large) than the absolute value of the average root slope and the absolute value of the average tip slope.

Table 1 provides the rated torque and the cogging torque associated with the machines shown in FIGS. 2, 3 and 4, which in all three cases are almost three orders of magnitude less than the rated torque. In prior art semi-closed slot designs, the slopes of the upper profiles of the root, transition and tip regions would all be similar (essentially three distinctly different regions would not exist), which would result in cogging torques of almost an order of magnitude greater than those in the table.

TABLE 1

| | Simulation Results for 3 PM Machines | | |
|---|---|---|---|
| Simulation Parameters | 24-slot, 32-pole PM Machine in FIG. 2 | 30-slot, 36-pole PM Machine in FIG. 3 | 28-slot, 36-pole PM Machine in FIG. 4 |
| Rated Torque (N-m) | 395 | 392 | 390 |
| Cogging Torque (N-m) | 1.1 | 1.2 | 0.6 |
| Cogging as % of Rated Torque | 0.3 | 0.3 | 0.2 |

Figure 6:
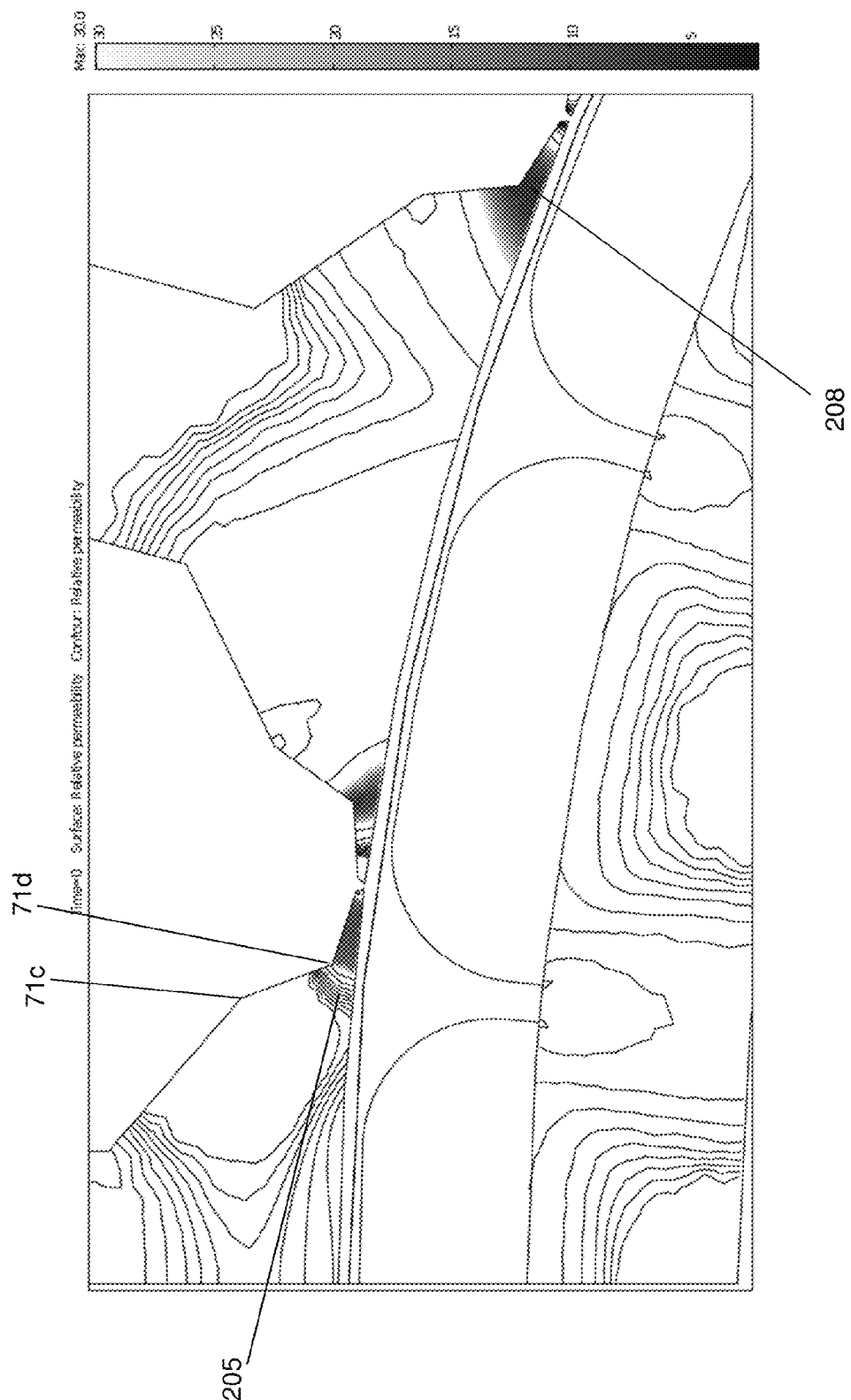
FIG. 6 illustrates an overlay contour and surface plots on a Slim Tip stator structure pursuant to the teachings of the instant invention.
Figure 7:
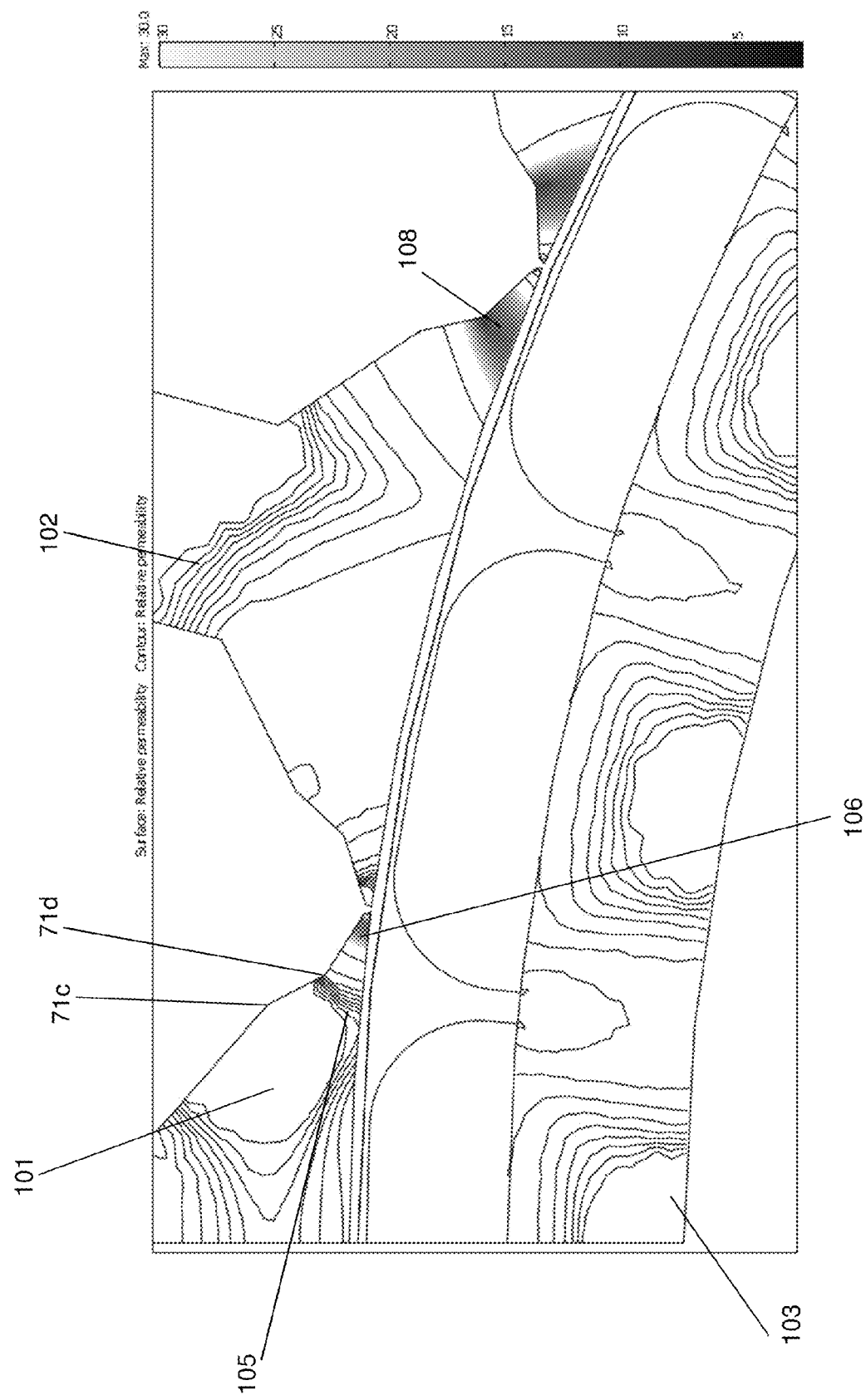
FIG. 7 illustrates an overlay contour and surface plots on a Medium Tip stator structure pursuant to the teachings of the instant invention.
Figure 8:
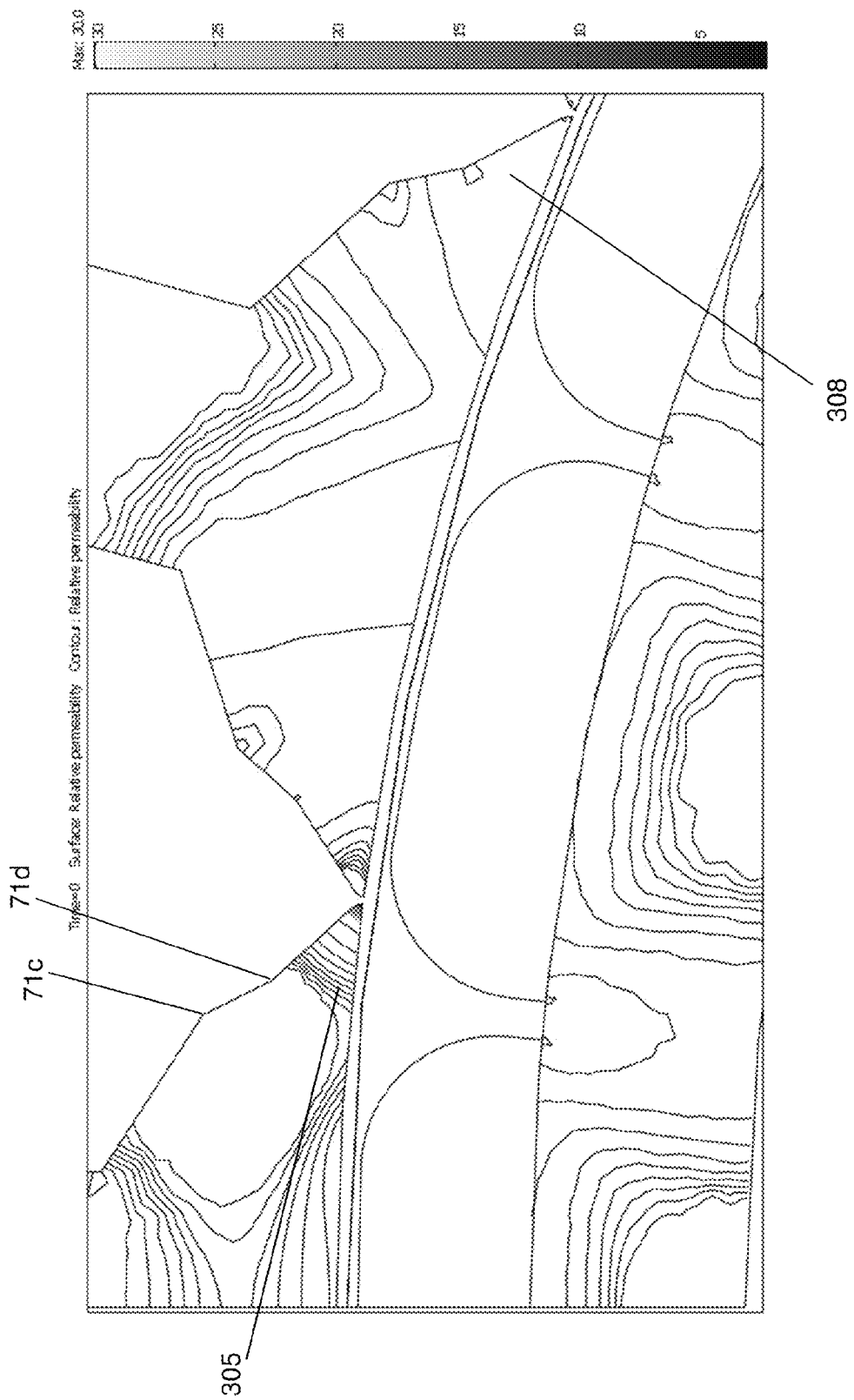
FIG. 8 illustrates a further overlay contour and surface plots on a Slim Tip stator structure pursuant to the teachings of the instant invention.

FIGS. 6, 7 and 8 show sections of three 24-slot, 32-pole PM machines that differ only in slightly different coordinates at the point labeled 71d. It should be understood that reference numerals 71c and 71d are boundary points for the transition region. The figures are overlaid within the stator and rotor iron core regions 101 and 103 of FIG. 7 with a contour plot 102 and a grayscale surface plot 106 and 108 of the relative magnetic permeability $\mu_R$ that shows how the permeability varies with respect to the shoe tip thickness, and how the abruptness of the transition from the root region to the tip region affects the permeability distribution. More tightly spaced contours represent more abrupt permeability variations, and darker grayscale represents lower permeability values. In going from FIG. 6 to FIG. 7 to FIG. 8, as the coordinate at 71d is changed, the permeability distribution in the shoe tip regions change as can be seen in the changes in contour spacings 205, 105 and 305 respectively, as well as the grayscale shadings 208, 108 and 308 respectively. Note that the permeabilities in the root regions of the shoes in all three figures remain largely unaffected by the permeability differences in the tip region. This is due to the presence of the transition region (see FIG. 5) which allows optimizing the tip region permeabilities while maintaining maximum permeabilities within the root region.

The permeability variations upon transitioning from the slot area to the shoe tip region are a major factor in determining cogging torque, and as shown in FIGS. 6-8, as opposed to the prior art design shown in FIG. 1, which does not have a transition region, this can best be optimized without affecting the permeability within the root region by using the multi-sectional shoe design of the invention. The variation in cogging torque tabulated in Table 2 for the three figures demonstrates this. The optimal permeability distributions are obtained for the FIG. 7 shoe design, as evidenced by its much smaller cogging torque (the FIG. 2 discussion further describes how to optimize the shoe design to minimize cogging torque). In Table 2, the FIGS. 6, 7 and 8 shoe designs are referred to as Slim Tip, Medium Tip and Fat Tip respectively. The last column lists the $\mu_R$ values at point "a" in the three figures, 208, 108, and 308 respectively. Cogging torque dips to a minimum of 1.3 N-m with the Medium Tip from a max of 30 N-m with the Slim Tip, then up to 14.5 N-m with the Fat Tip, which are order of magnitude variations. An interesting characteristic of the invention is that the Fat Tip cogging torque is significantly greater than that of the Medium Tip even though $\mu_R$ is significantly greater for the Fat Tip such that the Medium Tip is saturated but the Fat Tip is not.

TABLE 2

| | Cogging Torque Variation vs. Shoe Tip Size for 24-Slot, 32-Pole PM Machines | | |
|---|---|---|---|
| Shoe Tip Designation | New (x, y)-Coordinates for Coordinate Label 71d | Cogging Torque (N-m) | $\mu_r$ at Point "a" |
| Slim Tip (FIG. 6) | (0.951, 9.080) | 30.0 | 6 |
| Medium Tip (FIG. 7) | (0.951, 9.147) | 1.3 | 13 |
| Fat Tip (FIG. 8) | (0.951, 9.250) | 14.5 | 67 |

Figure 9:
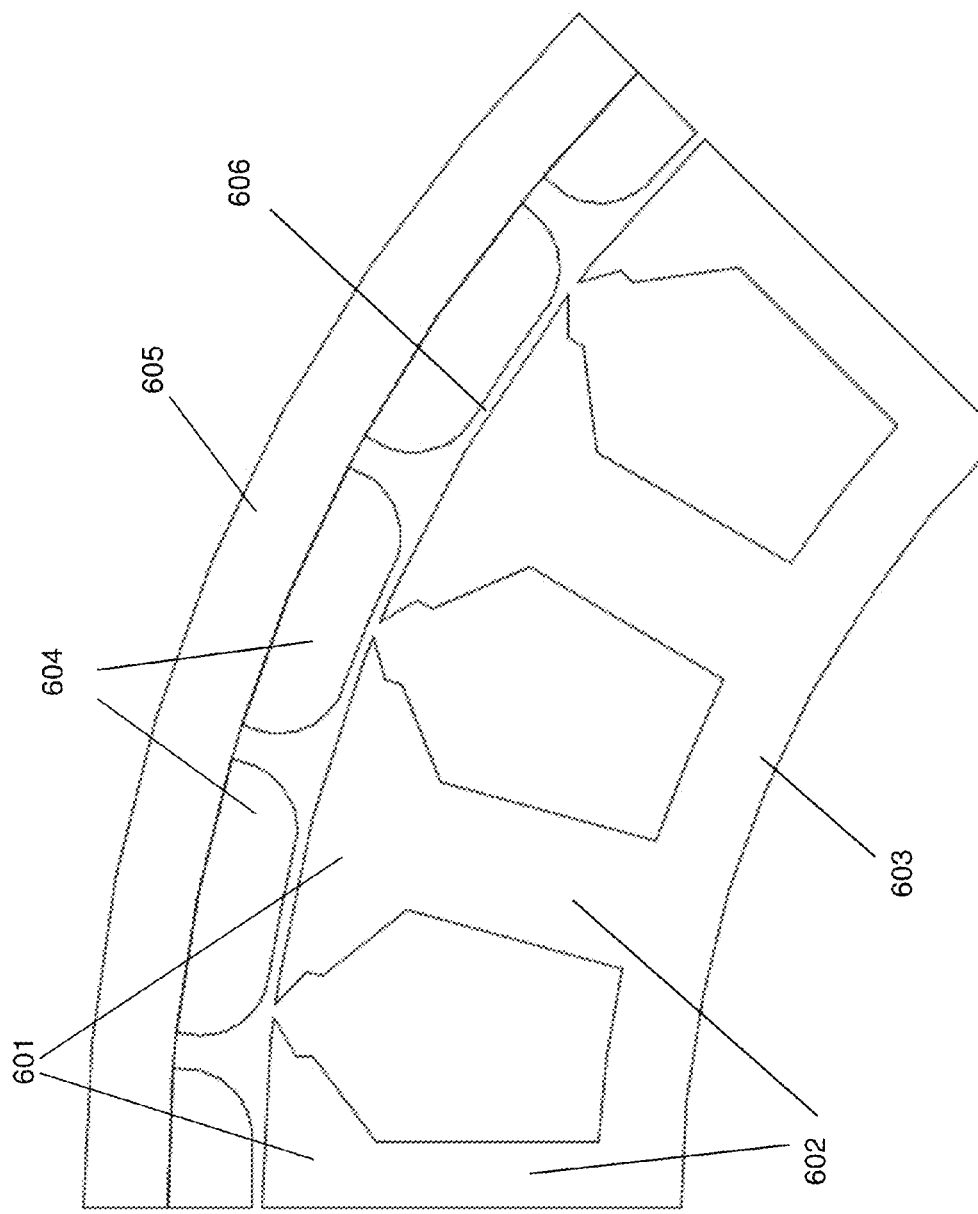
FIG. 9 illustrates a unit cell of a 3-phase exterior stator of the present invention.

FIG. 9 shows a unit cell of an exterior rotor example of the invention. The teeth 602 are connected via the stator back-iron 603, which together with the stator shoes 601 form the stator (stator coils not shown). The rotor contains the rotor magnets 604 and rotor back-iron 605 and is separated from the stator by the magnetic airgap 606.

Figure 10:
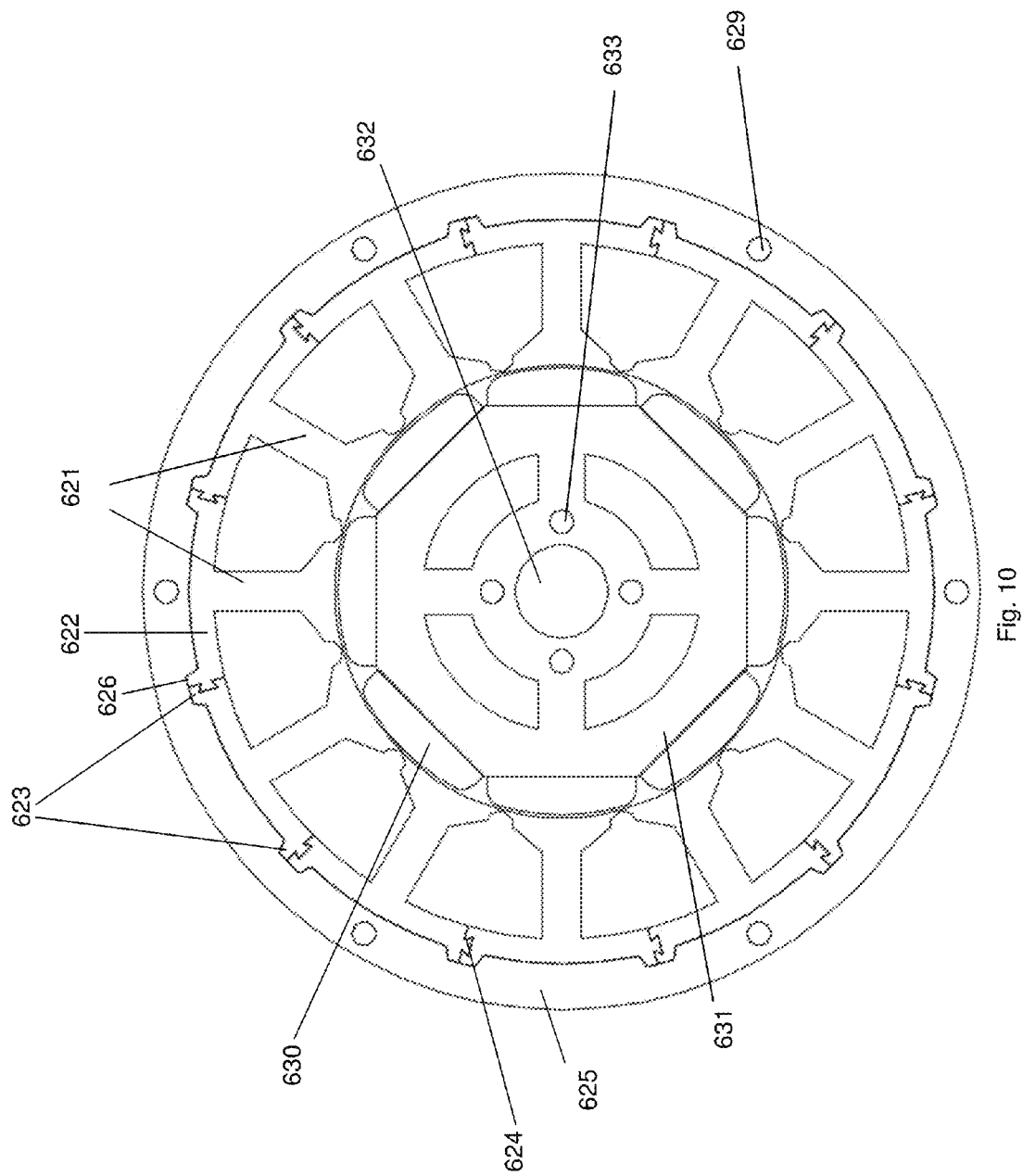
FIG. 10 depicts a 360 degree view of the rotor and stator of the present invention within a casing.

FIG. 10 shows an embodiment of the invention utilizing "bread-loaf" shaped poles 630 mounted on a polygon-shaped rotor back-iron 631, and surrounded by the assembled stator modules 621. In this case the module back-iron sections 622 contain bump-out sections 623 that allow the dovetail interface 624 between modules to cover greater surface area, thereby improving strength and rigidity. The stator assembly is surrounded by an aluminum case 625 containing channels 626 that fit snugly around the bump-out sections so as to more securely retain the stator assembly. Additionally, this arrangement provides for the keying of the stator assembly to the casing so as to prevent their relative motion. Attachment holes 629 allow bolting on of the cover plate (not shown). Also not shown is the generator drive shaft that fits within hole 632 and is bolted to the rotor through holes 633.

Figure 11:
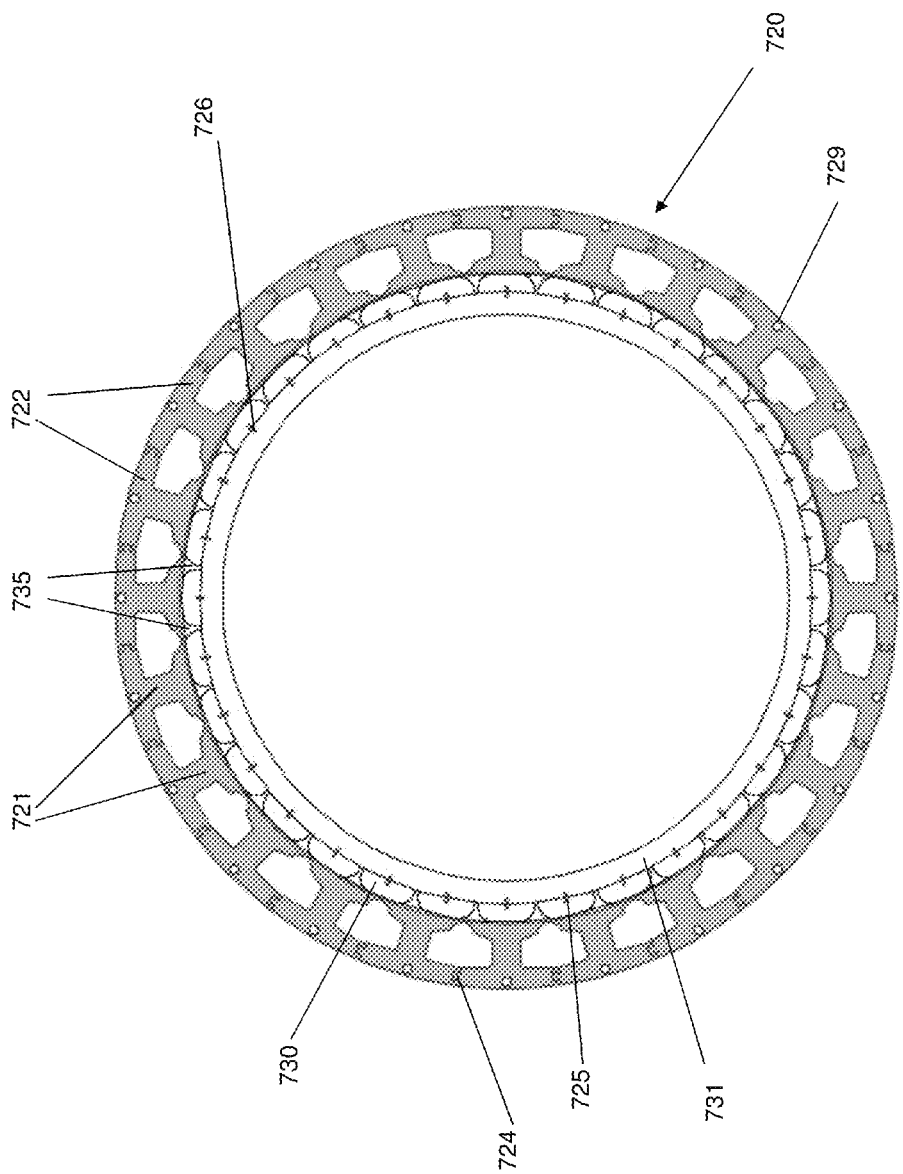
FIG. 11 illustrates a preferred embodiment of the rotor-stator assembly of the present invention.
Figure 12:
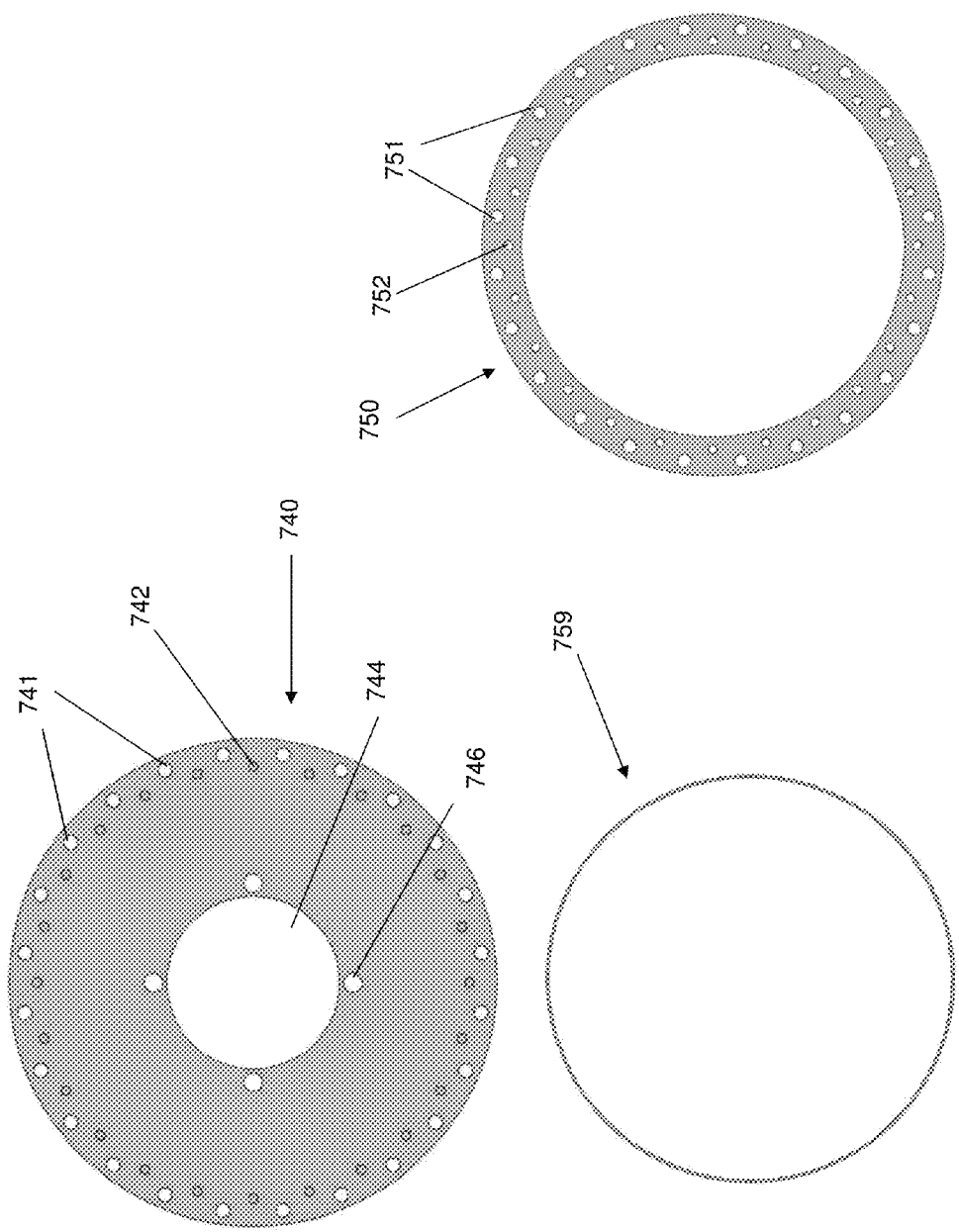
FIG. 12 illustrates a preferred configuration of steel casing components to structurally support the rotor and stator within a close spaced relation pursuant to the principles of the instant invention.

FIG. 11, shows a preferred rotor and stator assembly, and along with FIG. 12 shows additional structural assembly details not shown in prior figures. A 360 degree rotor and stator assembly 720 is shown in FIG. 11. It shows the PM's 730 mounted on rotor back-iron 731, and surrounded by the assembled stator modules 721. As with FIG. 10, the module back-iron sections 722 are connected via dovetail interfaces 724 between modules. The laminates comprising each module are secured by lamination interlocking via dimples formed within each laminate. Also, in this case holes within the PM's 725 align with holes within the rotor back-iron to allow partial retainment via steel pins 726. The remainder of the PM-to-rotor core retainment is accomplished by the use of a highly viscous no-run epoxy adhesive 735 applied to the tapered and radial surfaces of the PM's.

Except for the stainless steel pins and bearing housing with bearings, FIG. 12 shows the steel casing components required to structurally support the rotor and stator within close spaced relation. There are two endplates 740, two spacer rings 759 and one retainer ring 750. The center hole 744 and bolt holes 746 of the endplate allow mounting and bolting the circular bearing housing (not shown) that receives the generator drive shaft attached to the rotor. The outer plate holes 741 are for bolting the generator together, and the inner plate holes 742, which do not fully penetrate the endplate, align with the holes within the stator back-iron (729 of FIG. 11) and receive the stainless steel pins that go through these stator back iron holes, thereby directly keying the stator to the endplates. The outer diameter of the spacer ring is such that it fits just within the inner plate holes.

To assemble the generator, the spacer ring is first placed and centered onto the first endplate (which contains a bearing housing—not shown). The spacer ring serves to provide fixed spacing between the assembled stator modules (721 of FIG. 11) and the endplate, while the retainer ring is to help maintain the stator modules in position. The assembled stator modules with coils are then placed and centered onto the spacer ring, and the stainless steel pins (which extend through the axial length of the generator) are placed through the stator back-iron holes and into the inner plate holes. The second spacer ring is then placed and centered onto the assembled stator modules. Next, the retainer ring, which has inner retainer holes 752 and outer retainer holes 751 that align with the inner and outer plate holes respectively of the endplates, is placed and centered onto the second spacer ring such that the stainless steel pins fit through the inner retainer holes. Next, the generator drive shaft with attached rotor is inserted through the bearing housing (with bearings) attached to the first endplate, and the rotor is inserted within the stator assembly to establish the close spaced relation shown in FIG. 11. Next, the second endplate with bearing housing is inserted onto the other end of the drive shaft and pressed down onto the retainer ring and stainless steel pins such that pins fit within the inner plate holes. Finally, the generator is bolted together via bolts through the outer plate holes.

Figure 13:
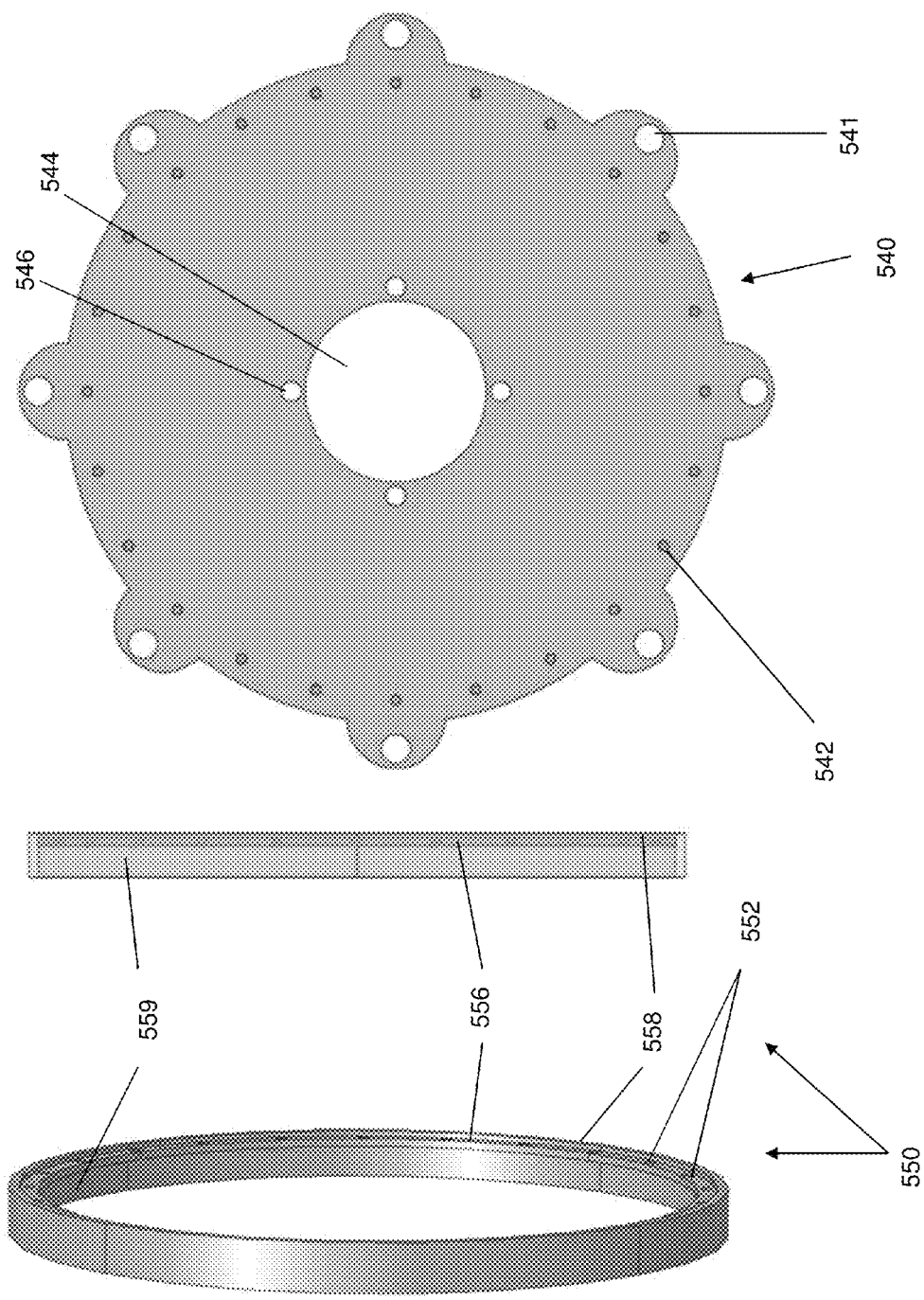
FIG. 13 illustrates another preferred configuration of steel casing components to structurally support the rotor and stator within a close spaced relation pursuant to the teachings of the present invention.

FIG. 13 shows alternative steel casing components required to structurally support the rotor and stator within close spaced relation. There are two endplates 540, and two stator braces 550. The stator brace contains an outer ring 559 and an inner ring 556 with holes 552 that align with those of the endplate 542 for receiving the stainless steel pins from the stator modules. The skirt section 558 slightly overhangs the inner ring. The stator brace is positioned onto the stator assembly such that the skirt section forms a lip around the edge of the stator backiron outside diameter (OD), and the inner ring sits on the flat face of the stator backiron. The endplate sits on other side of the stator brace and receives the stator pins into the semi-thru holes 542 thereby directly keying the stator to the endplates. The center hole 544 and bolt holes 546 of the endplate allow mounting and bolting the circular bearing housing (not shown) that receives the generator drive shaft attached to the rotor. The outer plate holes 541 are for bolting the generator together.

Figure 14:
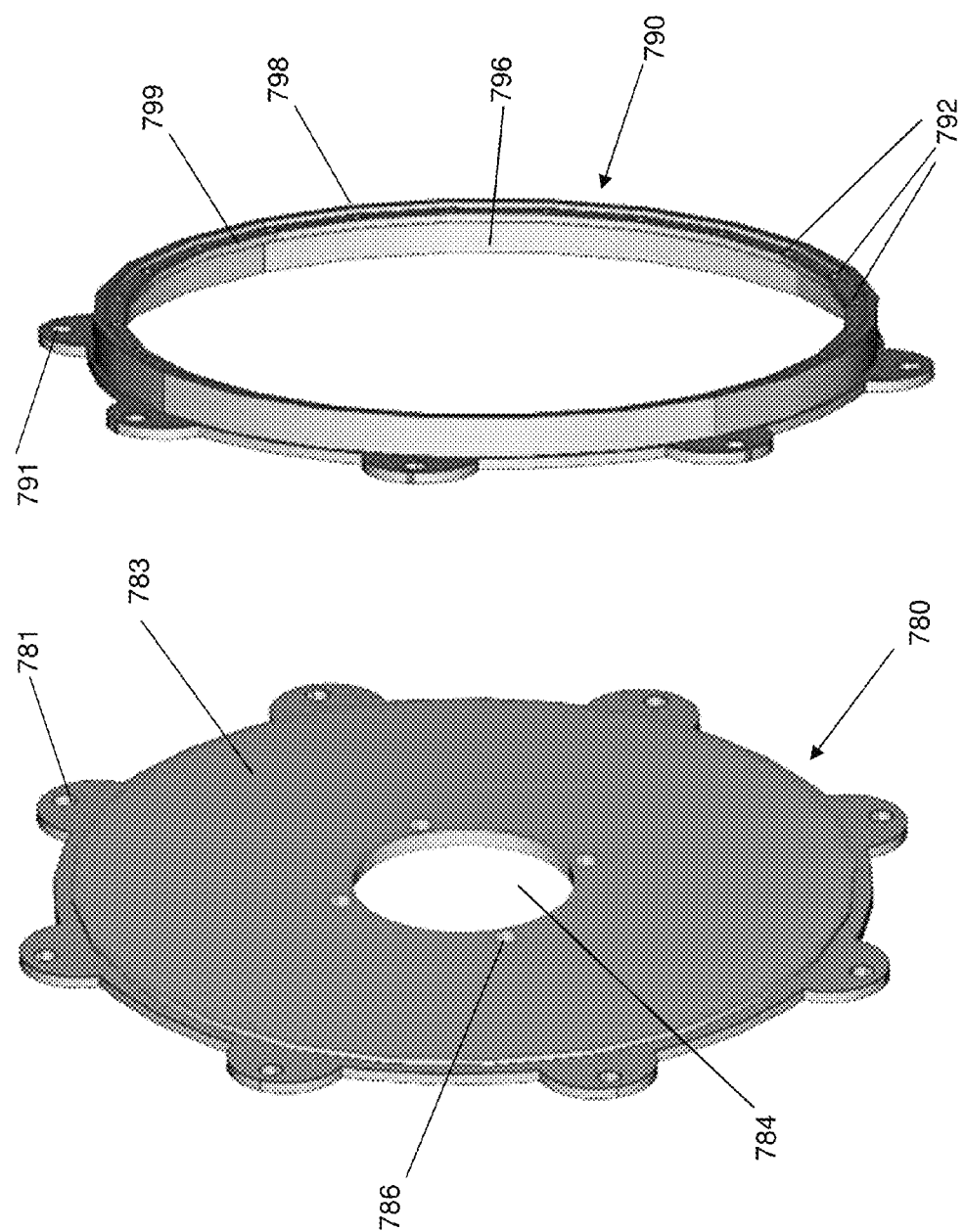
FIG. 14 illustrates still another preferred configuration of steel casing components to structurally support the rotor and stator within a close spaced relation pursuant to the teachings of the present invention.

FIG. 14 shows a preferred embodiment of the steel casing components required to structurally support the rotor and stator within close spaced relation. There are two endplates 780, and two stator braces 790. As before, the stator brace contains an outer ring 796 and an inner ring 799 with holes 792 for receiving the stainless steel pins from the stator modules. The skirt section 798 slightly overhangs the inner ring. The stator brace is positioned onto the stator assembly such that the skirt section forms a lip around the edge of the stator backiron OD, and the inner ring sits on the flat face of the stator backiron. The endplate sits on other side of the stator brace such that the ID of the inner ring fits securely around the OD of the raised middle section 783 or the endplate 780. Together with the alignment of the stator brace's and the endplate's outer holes 791 and 781 respectively, and subsequent bolting together with the other stator brace and endplate on the opposite side of the stator assembly, this provides an arrangement where the stator assembly is keyed to the stator brace via stainless steel pins, and the stator brace is keyed to the endplate via bolts so as to indirectly key the stator assembly to the endplate. The center hole 784 and bolt holes 786 of the endplate allow mounting and bolting the circular bearing housing (not shown) that receives the generator drive shaft attached to the rotor.

Figure 15:
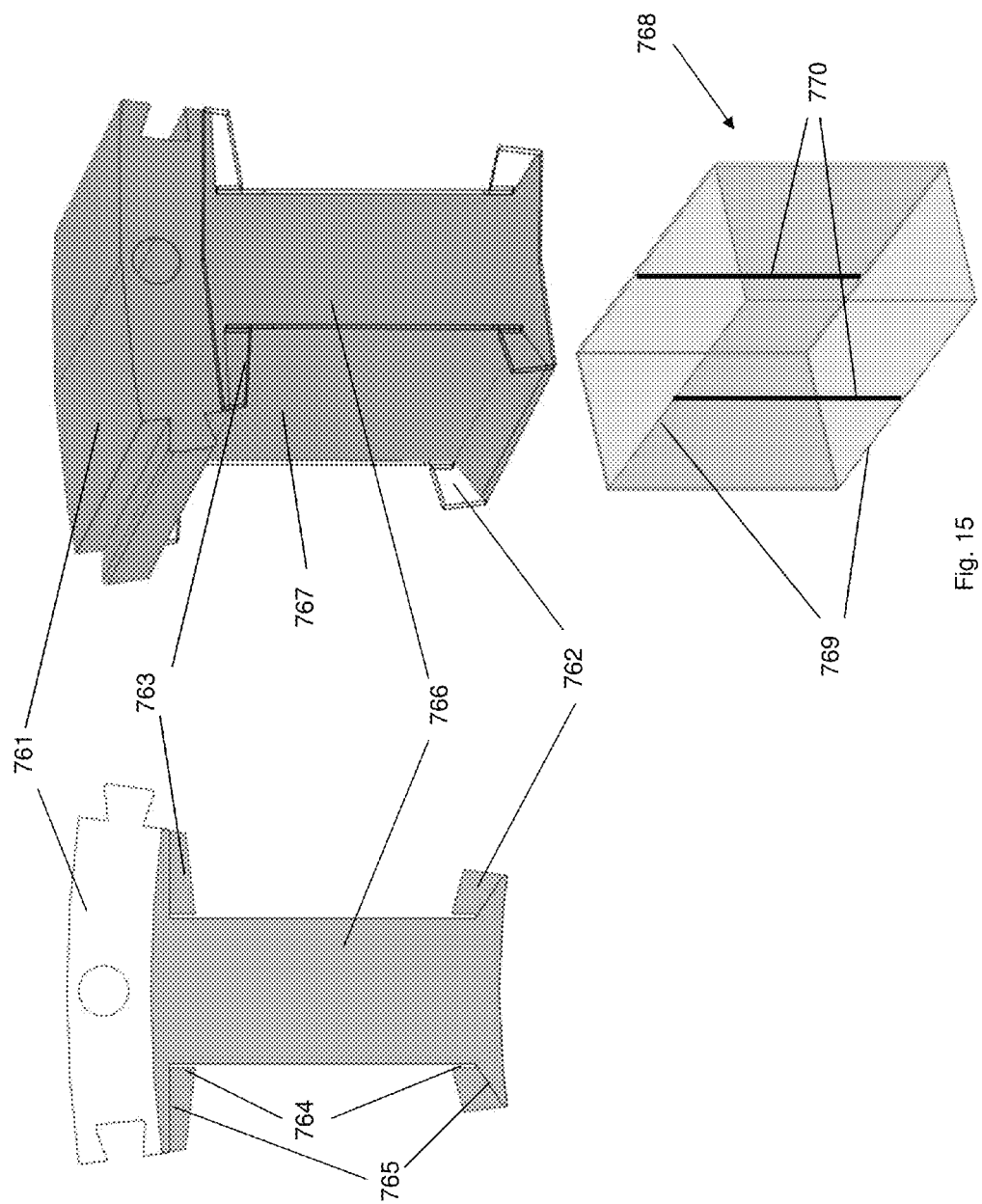
FIG. 15 illustrates 2-D and 3-D views of the stator module insulation end-plate mounted onto the stator module, and of the form of the stator module insulation paper pursuant to the teachings of the present invention.

FIG. 15 shows 2-D and 3-D views of the FR-4 stator module insulation end-plate 766 mounted onto the stator module 761, and the stator module Nomex insulation paper 768 that has been folded to form an insulation wrapper with height that matches the vertical section of the stator tooth 767 and insulation end-plate 766 such that when installed so as to surround the tooth and insulation end-plate, it fits snugly into the insulation end-plate slots 764, thereby insulating the vertical surfaces of the stator module from the stator coil and maintaining the insulating assembly in place about the stator teeth. Slits in the insulation paper 770 allow it to open up to be mounted around the tooth and end-plate. The stator coil is kept from the non vertical surfaces of the stator module 765 by the upper 763 and lower 762 insulation end-plate tabs. The end-plate slots are wide enough to accept the insulation paper, but too narrow for the coil wire to slip into. The stator coil is preferably kept from the non vertical surfaces of the stator module 765 by the upper 763 and lower 762 insulation end-plate tabs, thereby requiring relatively rigid end-plates with flexural strength preferably about twice that of the Nomex paper but higher ratios are envisioned, as is understood in the art.

Figure 16B:
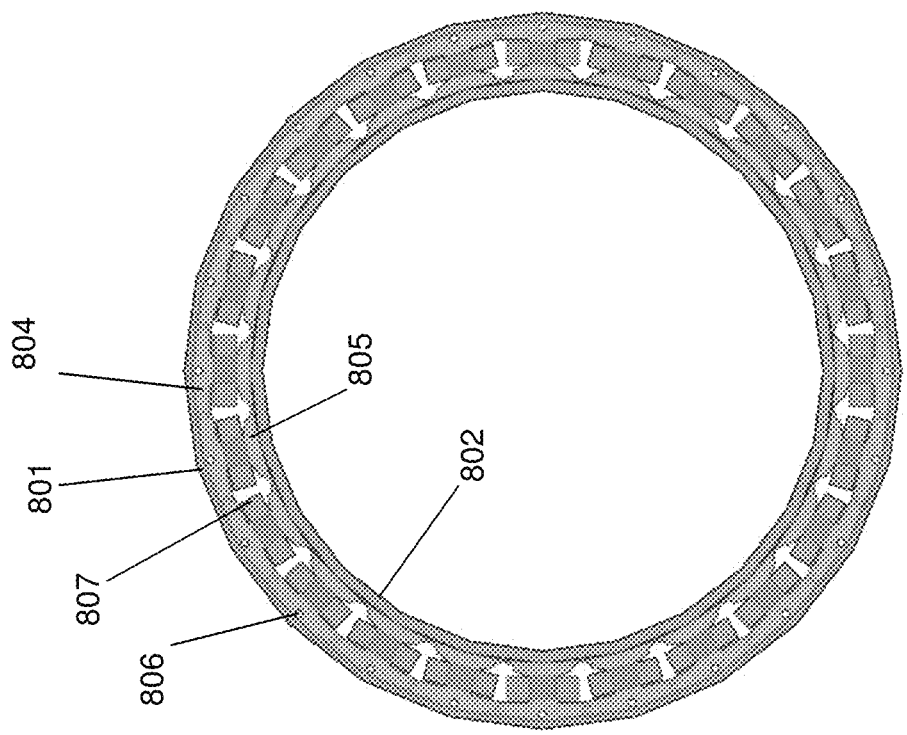
FIGS. 16A and 16B, respectively, illustrate a resin pan and a stator assembly, employed to encase the stator within a thermosetting polymer.
Figure 16A:
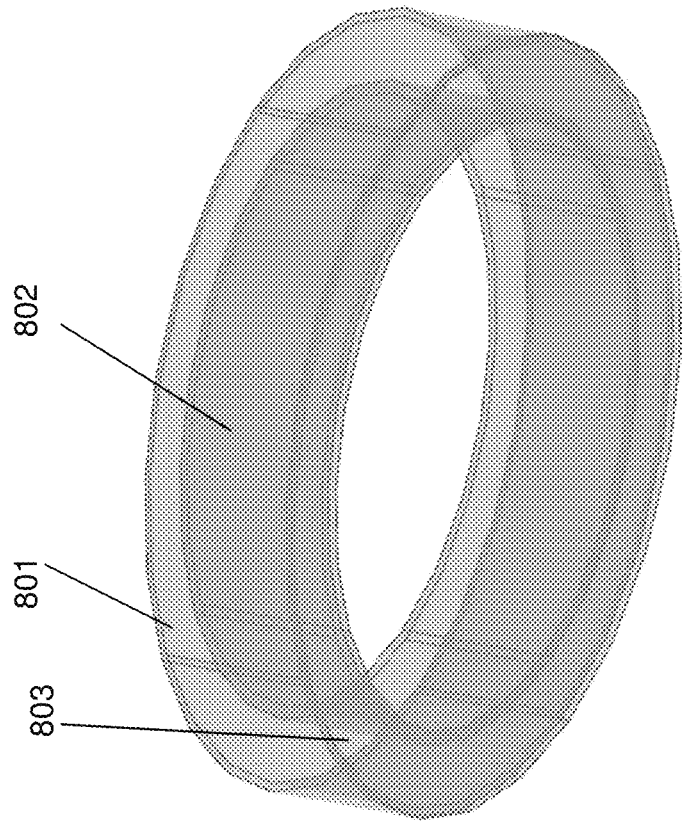

Finally, FIGS. 16A and 16B show the resin pan with stator assembly used to encase the stator within an epoxy resin. FIG. 16A is a perspective view of an empty cylindrical pan, while FIG. 16B is a top view of the aforementioned pan with the stator assembly within. The pan is comprised of an outer wall 801, an inner wall 802 and a bottom 803. The stator assembly with mounted coils 807 and back-iron and shoe sections 804 and 805 respectively, is loaded into the pan subsequent to coating the pan with an appropriate mold release agent, the back-iron holes 806 are plugged with close fitting pins, and epoxy resin is poured into the pan over the stator assembly so as to completely encase the stator (although as mentioned below, it could also be partially encased).

General Configurations

The invention is not limited to the configurations described in FIGS. 1-16 and hereinabove. It should be understood that any PM machine with semi-closed slots and multi-sectional shoes that can be demarcated into a tip section, a root section and transition section, where the tip section is periodically significantly magnetically saturated, is contemplated. For instance, note that while the main shoe body of some shoe shapes like those in FIGS. 2-6 can be easily demarcated, some cannot, and so the main shoe body can be defined by alternative means. For instance, the main shoe body can be defined as the region extending out to the maximum slope or inflection point of the shoe's upper contour. A further example is to use the point of the maximum slope or inflection point of the best fit normal distribution curve.

Also contemplated are PM machines with other types of magnet shaping, various numbers of phases, and various coil winding schemes. For instance, instead of a circularly sloped edge transition with constant radius of curvature such as 84b in FIG. 5, other sloped transitions could be used such as a straight line between points 84a and 84c or a series of straight lines that connect points 84a and 84c, or some type of polynomial or power curve that connects points 84a and 84c. Since points 84a and 84c are the points where the circular arc 84b with specified of radius of curvature intersects the circumferential and radial PM surface profiles respectively with continuity in the slopes of the respective lines, all other curves that connects the same two points can be described as having a congruent radius of curvature, and are contemplated by the invention.

PM machines with other cogging reduction schemes such as those discussed in the Background section are also contemplated, as are those with multiple stators and/or rotors. Also, although Neodymium/Iron/Boron (NIB) magnets are presently preferred, described and shown herein, it should be understood that any PM material could be used. Also, the retainment pins between the rotor iron and PM's can be made of any rigid material that constrains motion. And instead of a pin, a screw or bolt could be used to secure the PM to the rotor backiron. It would also be possible to use only the adhesive applied on top of the PM's without any retainment pins or screws. Likewise with the stator core, although cogging torque values reflecting electrical steel laminations were shown, other soft steel materials such as those formed from soft magnetic composite powders could be used.

Various modular configurations besides those shown are possible. A stator layout in which the back-iron is segmented so as to contain multiple teeth is one example. Of course, the standard one piece, non-modular stator is also possible. Various types of keyed interfaces between stator modules are also possible. The dovetail interface and the keyed interface of FIG. 4 are just examples. Any interface that helps arrest relative motion between modules is possible.

Only one interior stator layout was shown, but the innovation is applicable to all the interior stator versions in which the modular stator can replace the single-piece stator of the other interior stator versions. Also not shown are some of the secondary rotor and stator structural supports and fixtures for maintaining radial, circumferential, and lateral stability. All these are well known to one skilled in the art. Also possible are PM machines having various numbers of ratios of poles to teeth other than those shown. Also, the casing material can vary (aluminum instead of steel for example), and other fastening means besides bolts, pins and adhesives can be used (rivets for example). Also, stainless steel pins were used because a minimally magnetic material is preferred, but other minimally or non-magnetic material, such as FR-4 composite rods, are possible. Other material such as the various grades of steel could also be used.

Likewise, although FR-4 stator module insulation endplate and Nomex insulation paper were specified, these items can be any electrically insulating materials such as Mylar or other insulating paper, other rigid laminate, a flexible laminate, an insulating composite or plastic. Also, the insulation paper could be made in alternate shapes and comprise multiple sheets.

The casing could be made more traditionally in the form of an open ended can, and bearing housings could be made integral to the casing to receive the bearings, and various types of bearing arrangements could be used. Also, various types of gaskets or sealers may be used between the various endplates, stator braces, spacer rings and retainer rings. Also, instead of the types of outer holes used in FIG. 10 to bolt the generator together, some of the stainless steel pin holes in the endplates could be made thru holes, and bolts instead of pins could be used to bolt the generator together. All such casing arrangements involving the use of rigid pins through the stator assembly to directly or indirectly key the stator assembly to the endplates are contemplated by the invention.

Many modifications can be made to the stator encasement. For instance, other thermoset polymers such as polyester, a phenolic, or melamine could be used. Also, the stator assembly could be partially encased by masking off the back-iron sections and/or the shoe sections of the stator on the top surface and/or the bottom surface of the stator (the top surface is shown in FIG. 16B, but not the bottom surface). The fill level of the resin within the resin pan could also be adjusted to only partial encase the stator. The resin pan could also be shaped to provide thickness variations to the cured resin such as to provide structural reinforcements at particular circumferential locations.

It can thus be appreciated that the objectives of the present invention have been fully and effectively accomplished. The foregoing specific embodiments have been provided to illustrate the structural and functional principles of the present invention and are not intended to be limiting. To the contrary, the present invention is intended to encompass all modifications, alterations, and substitutions within the spirit and scope of the appended claims.

Furthermore, while the foregoing written description of the invention enables one of ordinary skill to make and use what is considered presently to be the best mode thereof, it should be understood that various changes, substitutions and alterations can be made herein without departing from the spirit and scope of the invention as defined by the appended claims. Therefore, the invention is not to be limited by the above described embodiment, method, and examples, but by all embodiments and methods within the scope and spirit of the invention as claimed.

The invention claimed is:

1. A permanent magnet generator/motor comprising: at least one rotor with a plurality of permanent magnets and at least one stator with a plurality of stator teeth made of soft magnetic material around which are stator coils;
   wherein said generator/motor has a casing structure that maintains said rotor and said stator within a close-spaced relation;
   wherein said at least one stator is segmented into stator segments, said segmented stator comprises single tooth segments;
   wherein said stator segments include thru-holes and rigid pins that extend through said thru-holes, said pins engaging said casing structure so as to constrain a motion of said stator segments relative to said casing structure;
   wherein said single tooth segments containing a back-iron section and a shoe section, and wherein said stator teeth have circumferential faces with normal vectors that point in a predominantly circumferential direction and axial faces with normal vectors that point in a predominantly axial direction, wherein axial insulation means are applied along said axial faces under said coils, and circumferential insulation means are applied along said circumferential faces under said coils, wherein said axial insulation means contain tabs that support said stator coils away from said back-iron section and said shoe section, and wherein said axial insulation means engages said circumferential insulation means such that both said axial and said circumferential insulation means remain in place around said single tooth segments, and wherein at least one of said axial insulation means and said circumferential insulation means is electrical insulation paper.

2. The permanent magnet generator/motor according to claim 1, wherein a point on one of said stator teeth is separated from a similar point on a neighboring stator tooth by a slot pitch angle, stator shoes made of soft magnetic material connected to the end of said stator teeth, wherein said shoes comprise a tooth region that is directly under said teeth, a root region that connects to said teeth region, a tip region at the distal end of the shoe, and a transition region that connects said root region to said tip region, wherein said root region has an upper profile with a substantially average root slope, an upper profile of said transition region having a substantially average transition slope, and an upper profile of said tip region having a substantially average tip slope, and wherein an absolute value of said average transition slope is greater than twice an absolute value of said average root slope and greater than twice an absolute value of said average tip slope.

3. The permanent magnet generator/motor according to claim 2, wherein tips of said tip regions are substantially pointy, and are separated from tips of adjacent stator shoes by a slot gap angle of less than 8% of said slot pitch angle.

4. The permanent magnet generator/motor according to claim 2, wherein magnetic interactions between said at least one rotor and at least one stator produce a cogging torque, wherein periodic magnetic saturation within said shoes occur as a function of the position of said magnets relative to said shoes such that all areas of said shoe tip region, in turn, periodically undergo said saturation, and wherein changes in said average tip slope that decrease the extent of said magnetic saturation tend to increase said cogging torque.

5. The permanent magnet generator/motor according to claim 1, wherein a magnet width in a circumferential direction is adjusted to decrease a cogging torque, such that changes within said magnet width that are small relative to said magnet width tend to cause order of magnitude increases in said cogging torque, and wherein said at least one rotor and said at least one stator are separated by at least one magnetic airgap with a radial thickness that separates said rotor magnets and said stator shoes, wherein surfaces within said magnetic airgap of said permanent magnets transition from a generally circumferential direction to a generally radial direction via a connecting surface with a profile having an average radius of curvature that is greater than said airgap radial thickness.

6. The permanent magnet generator/motor according to claim 1, wherein said at least one stator is at least one of fully encapsulated and partially encapsulated within at least one of a thermosetting plastic and a thermoplastic.

7. A permanent magnet generator/motor comprising: at least one rotor with a plurality of permanent magnets and at least one stator with a plurality of stator teeth connected by way of a back iron section, wherein said at least one stator is segmented into stator modules, wherein said generator/motor has a casing structure that maintains said rotor and said stator within a close-spaced relation, wherein said stator modules include thru-holes and rigid pins that extend through said thru-holes, said pins engaging said casing structure so as to constrain a motion of said stator modules relative to said casing structure;
   wherein said at least one stator is at least one of fully encapsulated and partially encapsulated within at least one of a thermosetting plastic and a thermoplastic.

8. The permanent magnet generator/motor according to claim 7, wherein said segmented stator comprises single tooth modules.

9. The permanent magnet generator/motor according to claim 8, wherein said single tooth modules contain said back-iron section and a shoe section, wherein said stator teeth have circumferential faces with normal vectors that point in a predominantly circumferential direction and axial faces with normal vectors that point in a predominantly axial direction, wherein axial insulation means are applied along said axial faces under said coils, and circumferential insulation means are applied along said circumferential faces under said coils, wherein said axial insulation means contain tabs that support said stator coils away from said back-iron section and said shoe section, and wherein said axial insulation means also contains engagement slots through which it engages said circumferential insulation means such that both said axial and said circumferential insulation means remain in place around said single tooth segments.

10. The permanent magnet generator/motor according to claim 7, wherein a point on one of said stator teeth is separated from the similar point on a neighboring stator tooth by a slot pitch angle, and further comprising: stator shoes made of soft magnetic material connected to the end of said stator teeth, wherein said shoes contain a tip region at the distal end of said shoes, and wherein tips of said tip regions are substantially pointy, and are separated from tips of adjacent stator shoes by a slot gap angle of less than 8% of said slot pitch angle.

11. The permanent magnet generator/motor according to claim 7, further comprising: shoes around said stator teeth, and having at least one magnetic airgap with a radial thickness that separates said rotor magnets and said stator shoes, wherein the surfaces within said magnetic airgap of said permanent magnets transition from a generally circumferential direction to a generally radial direction via a connecting surface with a profile having an average radius of curvature that is greater than said airgap radial thickness.

12. The permanent magnet generator/motor according to claim 7, wherein said pins are stainless steel.

13. The permanent magnet generator/motor according to claim 7, wherein said segmented stator comprises single tooth segments.

14. The permanent magnet generator/motor according to claim 7, further comprising stator shoes made of soft magnetic material connected to an end of said stator teeth, wherein a point on one of said stator teeth is separated from a similar point on a neighboring stator tooth by a slot pitch angle, wherein said shoes comprise a tooth region that is directly under said teeth, a root region that connects to said tooth region, a tip region at the distal end of the shoe, and a transition region that connects said root region to said tip region, wherein said root region has an upper profile with a substantially average root slope, an upper profile of said transition region having a substantially average transition slope, and an upper profile of said tip region having a substantially average tip slope, and wherein an absolute value of said average transition slope is greater than twice an absolute value of said average root slope and greater than twice an absolute value of said average tip slope, and wherein tips of said tip regions are separated from tips of adjacent stator shoes by a slot gap angle of less than 8% of said slot pitch angle.

15. A method of using a generator/motor for decreasing cogging torque between stator teeth of at least one stator and rotor magnets of at least one rotor, said method comprising the steps of:
   decreasing cogging torque between said stator teeth and said rotor magnets by shaping said stator teeth, and creating low permeance areas towards a distal region of said teeth such that said low permeance areas on adjacent neighboring teeth are in close proximity; and
   driving, periodically, said low permeance areas into magnetic saturation by said rotor magnets such that decreases in a spatial extent of said magnetic saturation cause substantial increases in cogging torque;
   wherein said stator teeth are a plurality of stator teeth made of soft magnetic material, wherein a point on one of said stator teeth is separated from a similar point on a neighboring stator tooth by a slot pitch angle;
   wherein said generator/motor has a casing structure that maintains said rotor and said stator within a close-spaced relation;
   wherein said at least one stator is segmented into stator modules, said segmented stator comprises single tooth modules;
   wherein said stator modules include thru-holes and rigid pins that extend through said thru-holes, said pins engaging said casing structure so as to constrain a motion of said stator modules relative to said casing structure;
   wherein said single tooth modules containing a back-iron section and a shoe section, and wherein said stator teeth have circumferential faces with normal vectors that point in a predominantly circumferential direction and axial faces with normal vectors that point in a predominantly axial direction, wherein axial insulation means are applied along said axial faces under said coils, and circumferential insulation means are applied along said circumferential faces under said coils, wherein said axial insulation means contain tabs that support said stator coils away from said back-iron section and said shoe section, and wherein said axial insulation means engages said circumferential insulation means such that both said axial and said circumferential insulation means remain in place around said single tooth modules;
   wherein at least one stator shoe made of soft magnetic material is connected to an end of each of said stator teeth.

16. The method according to claim 15, wherein said back-iron sections provide a low reluctance path connecting any two or more of said stator teeth.

17. The method according to claim 15, wherein said stator shoe comprising:
   a tooth region that is directly under said teeth;
   a root region that connects to said teeth region, said root region has an upper profile with a substantially average root slope;
   a tip region at a distal end of said stator shoe, said tip region has an upper profile having a substantially average tip slope, and said tip region featuring at least one tip being substantially pointy; and
   a transition region that connects said root region to said tip region, said transition region has an upper profile having a substantially average transition slope;
   wherein an absolute value of said average transition slope is greater than twice an absolute value of said average root slope and greater than twice an absolute value of said average tip slope;
   wherein tips of said tip regions are substantially pointy, and are separated from tips of adjacent stator shoes by a slot gap angle of less than 8% of said slot pitch angle 29.

18. The method according to claim 15, further comprising: shaping said permanent magnets such that the surface of said magnets within said magnetic airgap transitions from a generally circumferential direction to a generally radial direction via an average radius of curvature that is greater than said magnetic airgap.

19. The method according to claim 15, further comprising: encapsulating or partially encapsulating said stator modules within at least one of a thermosetting plastic and a thermoplastic.

20. A permanent magnet generator/motor comprising: at least one rotor with a plurality of permanent magnets and at least one stator with a plurality of stator teeth connected by way of a back iron section, wherein said at least one stator is segmented into stator modules, wherein said generator/motor has a casing structure that maintains said rotor and said stator within a close-spaced relation, wherein said stator modules include thru-holes and rigid minimally magnetic retaining means that extend through said thru-holes, said minimally magnetic retaining means engaging said casing structure so as to, at least in part, constrain a motion of said stator modules relative to said casing structure.

21. The permanent magnet generator/motor according to claim 20, wherein said minimally magnetic retaining means is at least one of stainless steel pins and stainless steel bolts.

22. The permanent magnet generator/motor according to claim 20 further comprising stator shoes made of soft magnetic material connected to the end of said stator teeth, wherein a point on one of said stator teeth is separated from a similar point on a neighboring stator tooth by a slot pitch angle, wherein said shoes comprise a tooth region that is directly under said teeth, a root region that connects to said tooth region, a tip region at the distal end of the shoe, and a transition region that connects said root region to said tip region, wherein said root region has an upper profile with a substantially average root slope, an upper profile of said transition region having a substantially average transition slope, and an upper profile of said tip region having a substantially average tip slope, and wherein an absolute value of said average transition slope is greater than twice an absolute value of said average root slope and greater than twice an absolute value of said average tip slope, and wherein tips of said tip regions are separated from tips of adjacent stator shoes by a slot gap angle of less than 8% of said slot pitch angle.

23. The permanent magnet generator/motor according to claim 20, wherein said at least one stator is at least one of fully encapsulated and partially encapsulated within at least one of a thermosetting plastic and a thermoplastic.

24. The permanent magnet generator/motor according to claim 20, wherein said segmented stator comprises single tooth modules.

25. The permanent magnet generator/motor according to claim 24, wherein said single tooth modules contain said back-iron section and a shoe section, and wherein said stator teeth have circumferential faces with normal vectors that point in a predominantly circumferential direction and axial faces with normal vectors that point in a predominantly axial direction, wherein axial insulation means are applied along said axial faces under said coils, and circumferential insulation means are applied along said circumferential faces under said coils, wherein said axial insulation means contain tabs that support said stator coils away from said back-iron section and said shoe section, and wherein said axial insulation means engages said circumferential insulation means such that both said axial and said circumferential insulation means remain in place around said single tooth segments, and wherein at least one of said axial insulation means and said circumferential insulation means is electrical insulation paper.

* * * * *